United States Patent
Swarts et al.

(10) Patent No.: US 8,126,948 B2
(45) Date of Patent: Feb. 28, 2012

(54) METHOD AND SYSTEM FOR CONSTANT AMPLITUDE RANDOM SEQUENCE CONSTRUCTION

(75) Inventors: Francis Swarts, San Diego, CA (US); Mark Kent, Vista, CA (US)

(73) Assignee: Broadcom Corporation, Irvine, CA (US)

( * ) Notice: Subject to any disclaimer, the term of this patent is extended or adjusted under 35 U.S.C. 154(b) by 1096 days.

(21) Appl. No.: 11/965,202

(22) Filed: Dec. 27, 2007

(65) Prior Publication Data

US 2008/0320067 A1 Dec. 25, 2008

Related U.S. Application Data

(60) Provisional application No. 60/944,833, filed on Jun. 19, 2007.

(51) Int. Cl.
*G06F 7/58* (2006.01)
(52) U.S. Cl. ....................................... 708/250
(58) Field of Classification Search ........... 708/250–256
See application file for complete search history.

(56) References Cited

U.S. PATENT DOCUMENTS

| | | | |
|---|---|---|---|
| 6,999,983 B2 * | 2/2006 | Suzuki et al. ............. | 708/250 |
| 2009/0110209 A1 * | 4/2009 | Li et al. ................. | 381/73.1 |
| 2010/0057653 A1 * | 3/2010 | Wilber .................. | 708/250 |

* cited by examiner

*Primary Examiner* — Tan V Mai
(74) *Attorney, Agent, or Firm* — Sterne, Kessler, Goldstein & Fox PLLC

(57) ABSTRACT

Aspects of a method and system for constant amplitude random sequence construction may include generating one or more real signal components via a random number generator, wherein each of the generated one or more real signal components may be subjected to an amplitude constraint. One or more corresponding imaginary signal components may be generated, each of which may be derived from a relationship between the generated one or more real signal components and the amplitude constraint. At least the generated one or more real signal components and the generated one or more corresponding imaginary signal components may be combined to generate a complex constant amplitude signal. The one or more real signal components may be generated according to a probability distribution in the random number generator.

18 Claims, 3 Drawing Sheets

METHOD AND SYSTEM FOR CONSTANT AMPLITUDE RANDOM SEQUENCE CONSTRUCTION

CROSS-REFERENCE TO RELATED APPLICATIONS/INCORPORATION BY REFERENCE

This application makes reference to, claims priority to, and claims the benefit of U.S. Provisional Application Ser. No. 60/944,833, filed on Jun. 19, 2007.

The above referenced application is hereby incorporated herein by reference in its entirety.

FIELD OF THE INVENTION

Certain embodiments of the invention relate to signal processing. More specifically, certain embodiments of the invention relate to a method and system for constant amplitude random sequence construction.

BACKGROUND OF THE INVENTION

Electronic communication has become prolific over the last decade. While electronic communication was initially limited to the desktop, recent trends have been to make communications, media content and the Internet available anytime, anywhere and, increasingly, on any device. Already now, it is quite common to find mobile devices such as cellular phones or Personal Digital Assistants (PDAs) that incorporate a large range of communication technologies and associated software. For example, fully-featured web-browsers, email clients, MP3 players, instant messenger software, and Voice-over-IP may all be found on some recent devices.

To support many different communication standards and data formats, it is desirable to use efficient signal processing, which may prolong battery life in portable devices, and reduce computational complexity.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for constant amplitude random sequence construction, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for constant amplitude random sequence construction. Aspects of the invention may comprise generating one or more real signal components via a random number generator, wherein each of the generated one or more real signal components may be subjected to an amplitude constraint. One or more corresponding imaginary signal components may be generated, each of which may be derived from a relationship between the generated one or more real signal components and the amplitude constraint. At least the generated one or more real signal components and the generated one or more corresponding imaginary signal components may be combined to generate a complex constant amplitude signal.

The one or more real signal components may be generated according to a probability distribution in the random number generator. The one or more real signal components may be added to the one or more corresponding imaginary signal components, each may be multiplied with the square root of minus one and a random sign variable, to generate the complex constant amplitude signal. The random sign variable may be generated via a random number generator or a pseudo-random number generator, and according to a probability distribution. The relationship may be defined that the amplitude constraint is equal to the sum of each squared one of the one or more real signal component plus each squared one of the one or more corresponding imaginary signal components.

Figure 1:
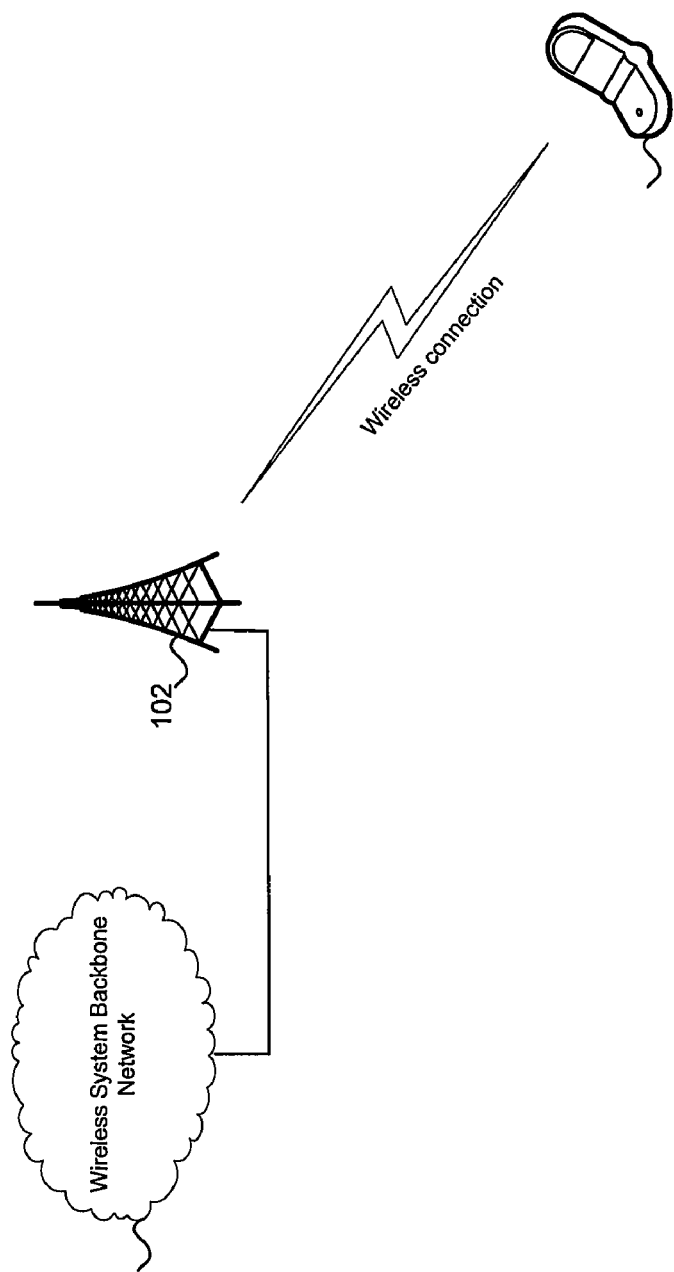
FIG. 1 is a block diagram illustrating an exemplary wireless radio system in accordance with an embodiment of the invention.

FIG. 1 is a block diagram illustrating an exemplary wireless radio system in accordance with an embodiment of the invention. Referring to FIG. 1, there is shown a base station 102, a mobile terminal 104, and a wireless system backbone network 106. There is also shown a wireless connection between the mobile terminal 104 and the base station 102, and a connection between the base station 102 and the wireless system backbone network 106.

The mobile terminal 104 may comprise suitable logic, circuitry and/or code that may be enabled to generate and/or receive radio-frequency (RF) signals in accordance with one or more RF technologies. In some instances, the mobile terminal 104 may generate and/or receive signals in accordance with cellular radio standards, broadband standards, and/or short-range communication standards. Exemplary cellular radio standards may comprise UMTS, GSM, EDGE, HSDPA, EV-DO, and CDMA 2000. Exemplary broadband standards may comprise WiMAX IEEE 802.16, and WiBro. Exemplary short range communications may comprise ULP, WLAN IEEE 802.11, UWB, and ZigBee. In some instances, the mobile terminal 104 may be stationary and the wireless connection between the mobile terminal 104 and the base station 102 may be varying. The base station 102 may comprise suitable logic, circuitry and/or code that may be enabled to receive and/or transmit radio signals that may be used to communicate with the mobile terminal 104. In addition, the base station 102 may communicate with the wireless system backbone network 106. The wireless system backbone network 106 may comprise suitable logic, circuitry and/or code that may be enabled to control the base station 102 and connect the mobile system to other networks, for example, the Internet.

In many instances, the mobile terminal 104 may require to communicate with the base station 102. In these instances, the mobile terminal 104 and the base station 102 may be required to synchronize data transmissions and/or receptions. For example, training data sequences may be transmitted that may be used by the mobile terminal 104 and/or the base station 102, to estimate the channel parameters of the wireless connection, or to determine the beginning of a frame, slot or other transmission unit. In some instances, it may be desirable that the training data sequences may comprise certain properties, for example, a constant amplitude.

Figure 2:
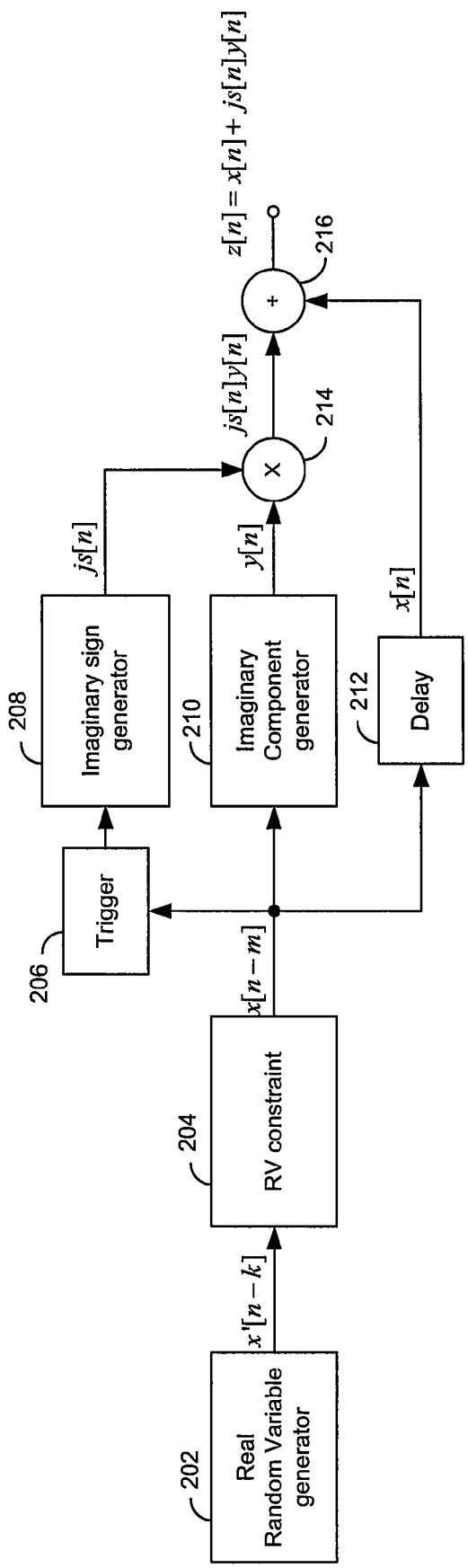
FIG. 2 is a block diagram of an exemplary complex constant amplitude random sequence generator, in accordance with an embodiment of the invention.

FIG. 2 is a block diagram of an exemplary complex constant amplitude random sequence generator, in accordance with an embodiment of the invention. Referring to FIG. 2, there is shown a real random variable (RV) generator 202, an RV constraint block 204, a trigger block 206, an imaginary sign generator 208, an imaginary component generator 210, a delay block 212, a multiplier 214, and an adder 216. There is also shown signals x'[n−k], x[n−m], s[n], y[n], x[n], and z[n], where a signal y[t] may denote the signal y at time instant t.

As described for FIG. 1, it may be desirable that training sequences may comprise certain characteristics that may be beneficial to the system performance. Such characteristics may comprise (pseudo-)randomness, constant amplitude, correlation properties and/or other signal properties. In accordance with various embodiments of the invention, complex random constant amplitude sequences may be generated as illustrated in FIG. 2. In the real RV generator 202, a random variable x[n−k]∈□ may be generated at time n−k. The real RV generator may comprise suitable logic, circuitry and/or code that may be enabled to generate (pseudo-)random real numbers, according to some probability distribution $p_x$. In most instances, it may be desirable to generate the RV x'[.] from a distribution that may generate both positive and negative numbers. In accordance with one embodiment of the invention, the probability distribution may be, for example, Gaussian (normal), that is $P_x = N(\mu, \sigma^2)$, where N may denote a normal distribution with mean $\mu$ and variance $\sigma^2$. The random variable x'[n−k] generated in the real RV generator 202 may be communicatively coupled to the RV constraint block 204. In accordance with various embodiments of the invention, a constant amplitude A∈□ may be required. Hence, the RV constraint block 204 may be used to ensure that RVs with an amplitude of less than A may be passed on to the output of the RV constraint block 204. Hence, the output of the RV constraint block 204 may be x[n−m]=x[n−k] if |x'[n−k]|≤A. Otherwise, if |x'[n−k]|>A, the input to the RV constraint block 204 may be discarded. In instances where a valid output x[n−m] may be generated by the RV constraint block 204, an imaginary component y[n] may be generated in the imaginary component generator 210. The imaginary component may be generated according to the following relationship:

$$y[n] = \sqrt{A - x^2[n]}$$

where a constant amplitude may be ensured since $A = x^2[n] + y^2[n]$.

The RV constraint block 204 may be communicatively coupled to the trigger block 206. The trigger block 206 may comprise suitable logic, circuitry and/or code that may be enabled to detect when a valid signal x[n−m] may be applied at its input and then trigger the imaginary sign generator 208. The imaginary sign generator block 208 may comprise suitable logic, circuitry and/or code that may be enabled to generate a random variable s[n]∈{−1,1}, for example when triggered by the trigger block 206. The RV s[n] may be generated according to a probability density function $p_s$. In accordance with one embodiment of the invention, s[n]=sgn(q[n]), where q[n]□N($\mu_s, \sigma_s^2$) may be drawn from a normal distribution with mean $\mu_s$ and variance $\sigma_s^2$. In accordance with another embodiment of the invention, the sign RV may be generated by s[n]=$I_{0.5}$(u[n]), where $I_{0.5}(r)$=−1 if 0≤r<0.5 and 1 if 0.5≤r≤1 and u[n] may be drawn from a uniform distribution such that u[n]=[0,1] may be drawn from the interval 0 to 1. The invention may not be limited to any specific method of generating the sign variable s[n]. The output of the imaginary component generator 210 and the output of the imaginary sign generator 208 may be communicatively coupled to the multiplier 214. The multiplier 214 may comprise suitable logic, circuitry and/or code that may be enabled to generate an output proportional to the product of its inputs. As illustrated in FIG. 2, the output of the multiplier 214 may be generated by multiplying the imaginary signal component y[n] with its associated sign s[n] and $j=\sqrt{-1}$ to generate the imaginary component of the output random variable z[n]. The output of the multiplier 214 may be communicatively coupled to the adder 216. The adder 216 may comprise suitable logic, circuitry and/or code that may be enabled to generate an output signal that may be proportional to the sum of its input signals. In accordance with FIG. 2, the adder 216 may generate the output RV z[n]=x[n]+js[n]y[n]. The real component x[n] may be generated by delaying the signal x[n−m] by m samples in the delay block 212. The delay block 212 may comprise suitable logic, circuitry and/or code that may be enabled to delay its input by a desirable amount of time. The delay block 212 may be used to synchronize the output from the RV constraint block 204 with the output of the multiplier 214. Hence, the output generated by the adder 216 may be a complex constant amplitude random variable |z[n]|=A, and a random sequence of length L may be constructed by generating, for example, {z[n], ..., z[n+L−1]}.

Figure 3:
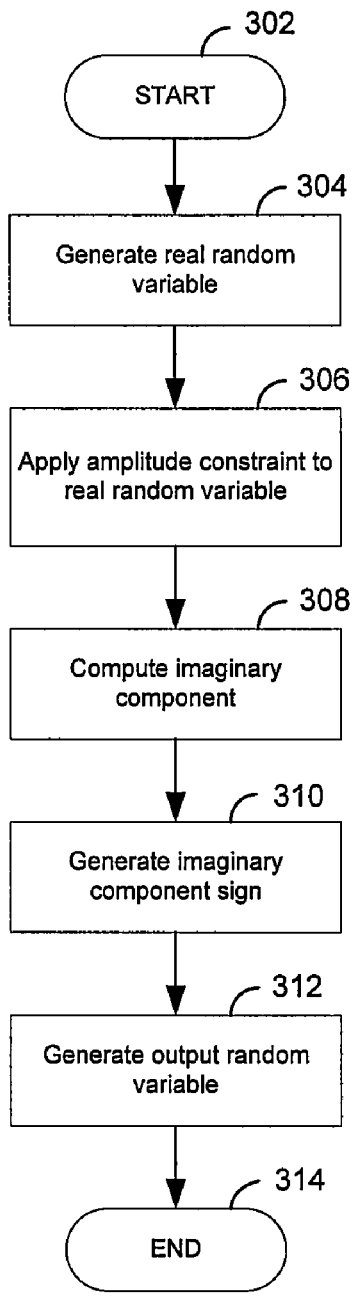
FIG. 3 is a flow chart illustrating exemplary generation of complex constant amplitude random variables, in accordance with an embodiment of the invention.

FIG. 3 is a flow chart illustrating exemplary generation of complex constant amplitude random variables, in accordance with an embodiment of the invention. In step 304, a real random variable x'[n] may be generated. In most instances, it may be desirable that the real random variable x'[n] may be positive or negative. The real random variable x'[n] may be derived from a probability distribution function $p_x$. In step 306, an amplitude constraint A may be applied to the real random variable x'[n]. In particular, a random variable x'[n] may be discarded in instances where its amplitude may exceed |x'[n]|>A. In instances where the amplitude may be within the constraint set by A, the imaginary signal component y[n]=$\sqrt{A - x^2[n]}$ may be computed in step 308. Because of the amplitude constraint x[n]<A, the imaginary signal component y[n]≥0. In some instances, it may be desirable to permit the imaginary signal component to be positive or negative. In these instances, an imaginary component sign variable s[n]∈{−1,1} may be generated in step 310. In step 312, the output random variable z[n]=x[n]+js[n]y[n] may be formed. The random variable z[n] may be complex, and of constant amplitude A.

In accordance with an embodiment of the invention, a method and system for constant amplitude random sequence construction may comprise generating one or more real signal components, for example x[n], via a random number generator, wherein each of the generated one or more real signal components may be subjected to an amplitude constraint, for example A, as illustrated by the RV constraint block 204. One or more corresponding imaginary signal components y[n] may be generated, for example in the imaginary component generator 210, each of which may be derived from a relationship between the generated one or more real signal components x[n] and the amplitude constraint A. At least the generated one or more real signal components x[n] and the generated one or more corresponding imaginary signal components y[n] may be combined, for example, in the multiplier 214 and the adder 216, to generate a complex constant amplitude signal z[n], as illustrated in FIG. 2.

The one or more real signal components x[n] may be generated according to a probability distribution in the random number generator, for example the RV generator 202. The one or more real signal components x[n] may be added to the one or more corresponding imaginary signal components y[n], each may be multiplied with the square root of minus one j=$\sqrt{-1}$ and a random sign variable s[n], to generate the complex constant amplitude signal z[n]=x[n]+js[n]y[n], as illustrated in FIG. 2 and FIG. 3. The random sign variable s[n] may be generated via a random number generator or a pseudo-random number generator, and according to a probability distribution, for example in the imaginary sign generator 208. The relationship between the imaginary signal component and the real signal component may be defined that the amplitude constraint is equal to the sum of each squared one of the one or more real signal component plus each squared one of the one or more corresponding imaginary signal components, that is A=$x^2$[n]+$y^2$[n], as described for FIG. 2 and FIG. 3.

Another embodiment of the invention may provide a machine-readable storage, having stored thereon, a computer program having at least one code section executable by a machine, thereby causing the machine to perform the steps as described herein for constant amplitude random sequence construction.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals, the method comprising:
in a communication device:
generating one or more real signal components via a random number generator, wherein each of said generated one or more real signal components is subjected to an amplitude constraint;
generating one or more corresponding imaginary signal components, each of which is derived from a relationship between said generated one or more real signal components and said amplitude constraint; and
combining at least said generated one or more real signal components and said generated one or more corresponding imaginary signal components to generate a complex constant amplitude signal.

2. The method according to claim 1, wherein said random number generator generates said one or more real signal components according to a probability distribution.

3. The method according to claim 1, comprising adding said one or more real signal components to said one or more corresponding imaginary signal components, each multiplied with the square root of minus one and a random sign variable, to generate said complex constant amplitude signal.

4. The method according to claim 3, comprising generating said random sign variable via a random number generator or a pseudo-random number generator.

5. The method according to claim 4, wherein said random number generator or said pseudo-random generator generates said random sign variable according to a probability distribution.

6. The method according to claim 1, wherein said relationship defines said amplitude constraint to be equal to the sum of each squared one of said one or more real signal component plus each squared one of said one or more corresponding imaginary signal components.

7. A system for processing signals, the system comprising:
one or more circuits, said one or more circuits enable:
generation of one or more real signal components via a random number generator, wherein each of said generated one or more real signal components is subjected to an amplitude constraint;
generation of one or more corresponding imaginary signal components, each of which is derived from a relationship between said generated one or more real signal components and said amplitude constraint; and
combination of at least said generated one or more real signal components and said generated one or more corresponding imaginary signal components to generate a complex constant amplitude signal.

8. The system according to claim 7, wherein said random number generator generates said one or more real signal components according to a probability distribution.

9. The system according to claim 7, wherein said one or more circuits add said one or more real signal components to said one or more corresponding imaginary signal components, each multiplied with the square root of minus one and a random sign variable, to generate said complex constant amplitude signal.

10. The system according to claim 9, wherein said one or more circuits generate said random sign variable via a random number generator or a pseudo-random number generator.

11. The system according to claim 10, wherein said random number generator or said pseudo-random generator generates said random sign variable according to a probability distribution.

12. The system according to claim 7, wherein said relationship defines said amplitude constraint to be equal to the sum of each squared one of said one or more real signal component plus each squared one of said one or more corresponding imaginary signal components.

13. A non-transitory computer-readable medium having stored thereon, a computer program having at least one code section executable by a machine, said at least one code section enabling:

generating one or more real signal components via a random number generator, wherein each of said generated one or more real signal components is subjected to an amplitude constraint;

generating one or more corresponding imaginary signal components, each of which is derived from a relationship between said generated one or more real signal components and said amplitude constraint; and combining at least said generated one or more real signal components and said generated one or more corresponding imaginary signal components to generate a complex constant amplitude signal.

14. The non-transitory computer-readable medium according to claim 13, wherein said random number generator generates said one or more real signal components according to a probability distribution.

15. The non-transitory computer-readable medium according to claim 13, comprising adding said one or more real signal components to said one or more corresponding imaginary signal components, each multiplied with the square root of minus one and a random sign variable, to generate said complex constant amplitude signal.

16. The non-transitory computer-readable medium according to claim 15, comprising generating said random sign variable via a random number generator or a pseudo-random number generator.

17. The non-transitory computer-readable medium according to claim 16, wherein said random number generator or said pseudo-random generator generate said random sign variable according to a probability distribution.

18. The non-transitory computer-readable medium according to claim 13, wherein said relationship defines said amplitude constraint to be equal to the sum of each squared one of said one or more real signal component plus each squared one of said one or more corresponding imaginary signal components.

* * * * *